United States Patent
Waxman

(10) Patent No.: US 7,548,729 B2
(45) Date of Patent: Jun. 16, 2009

(54) TECHNIQUES ENABLING FAST TRANSMIT RATES AND ANTENNA ADAPTATION FOR WIRELESS NETWORKS BASED ON EXPLICIT FEEDBACK

(75) Inventor: Shay Waxman, Haifa (IL)

(73) Assignee: Intel Corporation, Santa Clara, CA (US)

(*) Notice: Subject to any disclaimer, the term of this patent is extended or adjusted under 35 U.S.C. 154(b) by 392 days.

(21) Appl. No.: 11/274,728

(22) Filed: Nov. 14, 2005

(65) Prior Publication Data

US 2007/0111666 A1 May 17, 2007

(51) Int. Cl.
*H04B 1/00* (2006.01)
*H04B 7/00* (2006.01)

(52) U.S. Cl. .............. 455/69; 455/42; 455/456.5; 455/456.6; 370/325; 370/332; 370/352

(58) Field of Classification Search .............. 455/42, 455/456.5, 456.6, 69, 82, 83; 370/332, 328, 370/352
See application file for complete search history.

(56) References Cited

U.S. PATENT DOCUMENTS

| 7,146,164 | B2 * | 12/2006 | Hunzinger | .............. 455/423 |
| 2005/0036465 | A1 | 2/2005 | Waxman et al. | |
| 2005/0135459 | A1 | 6/2005 | Ginzburg et al. | |
| 2006/0067416 | A1 * | 3/2006 | Tirkkonen et al. | .......... 375/260 |
| 2006/0088006 | A1 * | 4/2006 | Chimitt | .............. 370/332 |
| 2006/0171482 | A1 * | 8/2006 | Trachewsky | ........... 375/267 |
| 2006/0256761 | A1 * | 11/2006 | Meylan et al. | .......... 370/338 |

FOREIGN PATENT DOCUMENTS

JP P2003-309571 A * 11/2003

OTHER PUBLICATIONS

Basson et al.—U.S. Appl. No. 10/812,385, filed Mar. 30, 2004—Device, System, And Method For Wireless Combined-signal Communication.
Waxman—U.S. Appl. No. 10/857,847, filed Jun. 2, 2004—Apparatus And Method For Adaptation Of Signal Detection Threshold In A Wireless Local Area Network Device . . . .
Waxman—U.S. Appl. No. 11/028,046, filed Jan. 4, 2005—Device, System And Method Of Detecting Erroneous Packets.
Waxman—U.S. Appl. No. 11/090,747, filed Mar. 24, 2005—Channel Scanning.
Waxman—U.S. Appl. No. 11/093,708, filed Mar. 30, 2005—Mechanism For The Hidden Node Problem In A Wireless Network.
Waxman Et Al—U.S. Appl. No. 11/037,184, filed Jan. 19, 2005—Apparatus And Method To Detect Collisions Of Data Packets.

(Continued)

*Primary Examiner*—Tuan A Pham
(74) *Attorney, Agent, or Firm*—James S. Finn

(57) ABSTRACT

An embodiment of the present invention provides an apparatus, comprising an access point in a wireless network capable of transmitting sounding packets to at least one wireless station in said wireless network, wherein said wireless station is capable of responding to said access point with information indicating the combination of antennas to use in communicating between said access point and said wireless station.

13 Claims, 1 Drawing Sheet

Combined rate-antenna explicit feedback mechanism

OTHER PUBLICATIONS

Waxman—U.S. Appl. No. 11/135,977, filed Mar. 24, 2005—Direct Link Establishment In Wireless Networks.

Waxman—U.S. Appl. No. 11/026,007, filed Dec. 31, 2004—Techniques To Manage Communication Rates In A Wireless Network.

Waxman—U.S. Appl. No. 11/095,935, filed Mar. 31, 2005—Passive Scanning Apparatus, Systems, And Methods.

Waxman—U.S. Appl. No. 11/141,333, filed Jun. 1, 2005—Device, System And Method Of Reduced Power Consumption Multi-receiver.

Waxman—U.S. Appl. No. 11/170,107, filed Jun. 30, 2005—Device, System And Method Of Wireless Signal Detection.

Waxman—U.S. Appl. No. 11/235,689, filed Sep. 27, 2005—Device, System And Method Of Locating A Wireless Communication Device.

Waxman—U.S. Appl. No. 11/171,835, filed Jun. 29, 2005—An Apparatus And Method For Combined Rate And Tx Antenna Selection Mechanism.

Waxman—U.S. Appl. No. 11/228,253, filed Sep. 19, 2005—Device, System And Method Of Clock Synchronization.

Waxman—U.S. Appl. No. 11/274,728, filed Nov. 14, 2005—Techniques Enabling Fast Transmit Rates And Antenna Adaptation For Wireless Networks Based On Explicit . . . .

Waxman—U.S. Appl. No. 11/322,679, filed Dec. 30, 2005—System And Method For Communicating With Mobile Stations Over An Extended Range In A Wireless Local . . . .

Waxman—U.S. Appl. No. 11/322,465, filed Dec. 30, 2005—Wireless Communication Device And Method For Coordinating Communications Among . . . .

Waxman—U.S. Appl. No. 11/340,327, filed Jan. 25, 2006—Apparatus, System And Method With Improved Coexistence Between Multiple Wireless Communication . . . .

Waxman—U.S. Appl. No. 11/351,932, filed Feb. 10, 2006—Mobile Station And Method For Channel Sounding Using A Single Radio Frequency Transmitter Chain . . . .

* cited by examiner

TECHNIQUES ENABLING FAST TRANSMIT RATES AND ANTENNA ADAPTATION FOR WIRELESS NETWORKS BASED ON EXPLICIT FEEDBACK

BACKGROUND

Wireless communications, including wireless networks, have become pervasive throughout society. Improvements in wireless communications are vital to increase their reliability and speed. Current feed back techniques in some wireless networks may provide explicit feedback mechanisms for dealing with relatively fast varying channels/interference levels and getting maximal throughput is those cases. Existing explicit modulation coding scheme (MCS)/rate feedback mechanisms may allow fast adaptation of the rate, but does not address the issue of fast antenna selection, which is as equally important for dealing with a varying environment.

Thus, a strong need exists for techniques that enable fast transmit rates and antenna adaptation for wireless networks based on explicit feedback.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
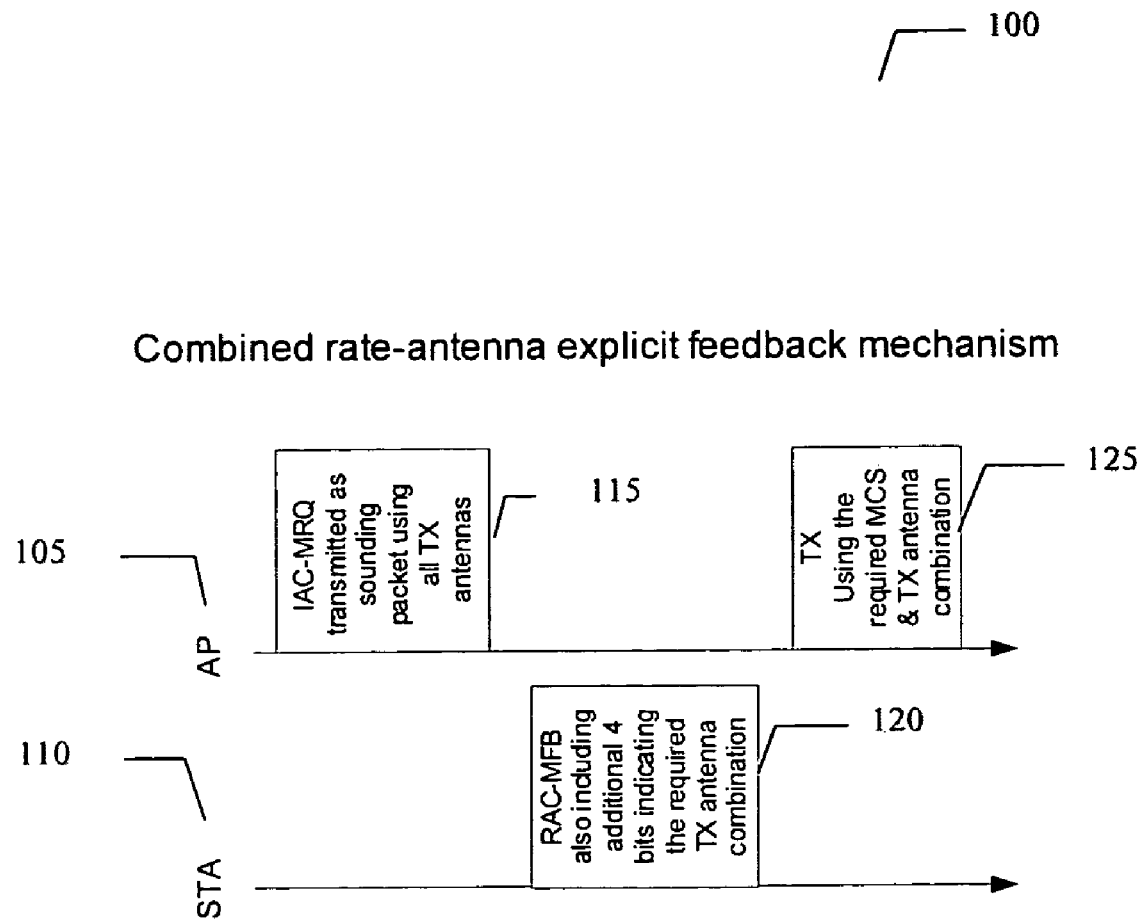
FIG. 1 illustrates a combined rate-antenna explicit feedback technique of one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

An algorithm, technique or process is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause and effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like), wireless wide are networks (WWAN) and Mesh networks.

Turning to the figures, FIG. 1, shown generally as 100, illustrates a combined rate-antenna explicit feedback technique of one embodiment of the present invention. Some embodiments of the present invention provide an apparatus, comprising an access point 105 in a wireless network capable of transmitting sounding packets 115 to at least one wireless station 110 in the wireless network, wherein the wireless station 110 is capable of responding to the access point 105 with information indicating the combination of antennas to use in communicating between the access point and the wireless station. The information indicating the combination of antennas to use for communicating between the access point and the wireless station may be provided by the wireless station transmitting feedback using the Responder Aggregation Control (RAC) 120 with additional information bits containing the information indicating the combination of antennas to use. In an embodiment of the present invention, the bit number may be four bits capable of representing four antennas—although the present invention is not limited to any particular number of bits or any particular number of antennas. Access point 105 may then transmit using the required modulation coding scheme (MCS) and transmit antenna combination 125.

In an embodiment of the present invention, the wireless network may be an 801.11n wireless local area network and the sounding may be provided by the access point sending an Initiator Aggregation control/MCS Request (IAC-MRQ) and exciting all transmit antennas using a sounding packet turn on the appropriate sounding packet flag in the high throughput signal (HT-SIG) field. An embodiment of the present invention may further provide that cyclic delay diversity (CDD) is supported by setting more than 1 antenna selection bit when an MCS rate <=54 Mbps is returned as feedback.

Other embodiments of the present invention may provide a method, comprising adapting antenna use configurations used in wireless transmissions between wireless devices based on explicit feedback by at least one of the wireless devices. This method may further comprise including in the explicit feedback information indicating the combination of antennas to use in communicating between the wireless devices. Further, in an embodiment of the present invention, the method may further comprise transmitting sounding packets by at least one other wireless device to the least one wireless device and wherein the at least one wireless device is capable of responding to the at least one other wireless device with information indicating the combination of antennas to use in communicating between the wireless devices. This method may further comprise indicating the combination of antennas to use for communicating between the wireless devices by the at least one wireless device transmitting feedback to the at least one other wireless device using a Responder Aggregation Control with additional information bits containing the information indicating the combination of antennas to use.

Other embodiments of the present invention may provide a system, comprising at least one wireless station in a wireless communication network and a base station capable of transmitting sounding packets to the at least one wireless station in the wireless network, wherein the at least one wireless station is capable of responding to the base station with information indicating the combination of antennas to use in communicating between the base station and the at least one wireless station.

Some other embodiment of the present invention may also provide a machine-accessible medium that provides instructions, which when accessed, cause a machine to perform operations comprising adapting antenna use configurations used in wireless transmissions between wireless devices based on explicit feedback by at least one of the wireless devices. The operation may further comprise including in the explicit feedback information indicating the combination of antennas to use in communicating between the wireless devices and transmitting sounding packets by at least one other wireless device to the least one wireless device and wherein the at least one wireless device is capable of responding to the at least one other wireless device with information indicating the combination of antennas to use in communicating between the wireless devices.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An apparatus, comprising:
an access point in a wireless network capable of transmitting sounding packets to at least one wireless station in said wireless network, wherein said wireless station is capable of responding to said access point with information indicating the combination of antennas to use in communicating between said access point and said wireless station; and
wherein said information indicating the combination of antennas to use for communicating between said access point and said wireless station is provided by said wireless station transmitting feedback using the Responder Aggregation Control with additional information bits containing said information indicating the combination of antennas to use; wherein cyclic delay diversity (CDD) is supported by setting more than 1 antenna selection bit when an modulation coding scheme (MCS) rate <=54 Mbps is returned as feedback.

2. The apparatus of claim 1, wherein said bits are four bits capable of representing four antennas.

3. The apparatus of claim 1, wherein said wireless network is an 801.11n wireless local area network.

4. The apparatus of claim 3, wherein said sounding is provided by said access point sending an Initiator Aggregation control/MCS Request (IAC-MRQ) and exciting all transmit antennas using a sounding packet turn on the appropriate sounding packet flag in the HT-SIG field.

5. A method, comprising:
adapting antenna use configurations used in wireless transmissions between wireless devices based on explicit feedback by at least one of said wireless devices;
including in said explicit feedback information indicating the combination of antennas to use in communicating between said wireless devices;
transmitting sounding packets by at least one other wireless device to said least one wireless device and wherein said at least one wireless device is capable of responding to said at least one other wireless device with information indicating the combination of antennas to use in communicating between said wireless devices; and
indicating the combination of antennas to use for communicating between said wireless devices by said at least one wireless device transmitting feedback to said at least one other wireless device using a Responder Aggregation Control with additional information bits containing said information indicating the combination of antennas to use;
wherein supporting cyclic delay diversity (CDD) by setting more than 1 antenna selection bit when an modulation coding scheme (MCS) rate <=54 Mbps is returned as feedback.

6. The method of claim 5, wherein said bits are four bits capable of representing four antennas.

7. The method of claim 5, further comprising communicating between said wireless devices using an 801.11n wireless local area network communication protocol.

8. The method of claim 5, wherein said sounding is provided by at least one other wireless device sending an Initiator Aggregation control/MCS Request (IAC-MRQ) and exciting all transmit antennas on at least one wireless device using a sounding packet turn on an appropriate sounding packet flag in the HT-SIG field.

9. A system, comprising:

at least one wireless station in a wireless communication network; and a base station capable of transmitting sounding packets to said at least one wireless station in said wireless network, wherein said at least one wireless station is capable of responding to said base station with information indicating the combination of antennas to use in communicating between said base station and said at least one wireless station;

wherein said information indicating the combination of antennas to use for communicating between said base station and said at least one wireless station is provided by said at least one wireless station transmitting feedback using the Responder Aggregation Control with additional information bits containing said information indicating the combination of antennas to use;

wherein cyclic delay diversity (CDD) is supported by setting more than 1 antenna selection bit when an modulation coding scheme (MCS) rate <=54 Mbps is returned as feedback.

10. The system of claim 9, wherein said bits are four bits capable of representing four antennas.

11. The apparatus of claim 9, wherein said wireless network is an 801.11n wireless local area network.

12. The system of claim 9, wherein said sounding is provided by said base station sending an Initiator Aggregation control/MCS Request (IAC-MRQ) and exciting all transmit antennas using a sounding packet turn on the appropriate sounding packet flag in the HT-SIG field.

13. A machine accessible medium storing a machine program that provides instructions, which when accessed, cause a machine to perform operations comprising:

adapting antenna use configurations used in wireless transmissions between wireless devices based on explicit feedback by at least one of said wireless devices;

transmitting sounding packets by at least one other wireless device to said least one wireless device and wherein said at least one wireless device is capable of responding to said at least one other wireless device with information indicating the combination of antennas to use in communicating between said wireless devices; and transmitting feedback to said at least one other wireless device using a Responder Aggregation Control with additional information bits containing said information indicating the combination of antennas to use;

wherein cyclic delay diversity (CDD) is supported by setting more than 1 antenna selection bit when an modulation coding scheme (MCS) rate <=54 Mbps is returned as feedback.

* * * * *